US006685560B1

(12) United States Patent
Hughes

(10) Patent No.: US 6,685,560 B1
(45) Date of Patent: Feb. 3, 2004

(54) GAMING MACHINE WITH VIRTUAL OPPONENT FEATURE

(75) Inventor: Darryl W. Hughes, Oak Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 496 days.

(21) Appl. No.: 09/814,076

(22) Filed: Mar. 21, 2001

(51) Int. Cl.[7] .................................................. A63F 13/00

(52) U.S. Cl. .............................. 463/16; 463/20; 463/25

(58) Field of Search ............................... 463/16–20, 25, 463/29; 273/138.1, 138.2, 139

(56) References Cited

U.S. PATENT DOCUMENTS

| | | | | |
|---|---|---|---|---|
| 3,796,433 A | | 3/1974 | Fraley et al. | 273/138 A |
| 5,580,059 A | * | 12/1996 | Marks | 273/271 |
| 5,941,770 A | * | 8/1999 | Miers et al. | 463/13 |
| 6,158,741 A | * | 12/2000 | Koelling | 273/292 |
| 6,309,300 B1 | * | 10/2001 | Glavich | 463/26 |
| 6,345,824 B1 | * | 2/2002 | Selitzky | 273/292 |
| 6,347,996 B1 | * | 2/2002 | Gilmore et al. | 463/17 |
| 6,425,824 B1 | * | 7/2002 | Baerlocher et al. | 463/16 |
| 6,439,995 B1 | * | 8/2002 | Hughs-Baird et al. | 463/20 |
| 6,443,837 B1 | * | 9/2002 | Jaffe et al. | 463/16 |
| 6,520,855 B2 | * | 2/2003 | DeMar et al. | 463/20 |
| 2003/0013519 A1 | * | 1/2003 | Bennett | 463/25 |

FOREIGN PATENT DOCUMENTS

| | | | |
|---|---|---|---|
| WO | WO 97/27921 | 8/1997 | A63F/9/24 |

* cited by examiner

*Primary Examiner*—John M Hotaling, II
(74) *Attorney, Agent, or Firm*—Jenkens & Gilchrist

(57) ABSTRACT

A gaming machine controlled by a processor in response to a wager includes a chance game feature. The chance game feature includes a first portion and a second portion. The first portion is associated with the processor and randomly generates a first bonus. The second portion is associated with the player and randomly generates a second bonus. The processor awards the first bonus to the player in response to the second portion prevailing over the first portion in a competition between the first and second portions. The processor preferably awards the second bonus to the player, regardless of the winner of the competition.

22 Claims, 10 Drawing Sheets

12

12

GAMING MACHINE WITH VIRTUAL OPPONENT FEATURE

FIELD OF THE INVENTION

The present invention relates generally to gaming machines for playing games of chance and, more particularly, to a gaming machine including a virtual opponent feature.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, shrewd operators strive to employ the most entertaining and exciting machines available because such machines attract frequent play and, hence, increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features for bonus games to satisfy the demands of players and operators. Preferably, such new bonus game features will maintain, or even further enhance, the level of player excitement offered by bonus games heretofore known in the art. The present invention is directed to satisfying these needs.

SUMMARY OF THE INVENTION

In accordance with the present invention, a gaming machine controlled by a processor in response to a wager includes a chance game feature. The chance game feature includes a first portion and a second portion. The first portion is associated with the processor and randomly generates a first bonus. The second portion is associated with the player and randomly generates a second bonus. The processor awards the first bonus to the player in response to the second portion prevailing over the first portion in a competition between the first and second portions. The processor preferably awards the second bonus to the player, regardless of the winner of the competition.

BRIEF DESCRIPTION OF THE DRAWINGS

The foregoing and other advantages of the invention will become apparent upon reading the following detailed description and upon reference to the drawings.

Figure 1:
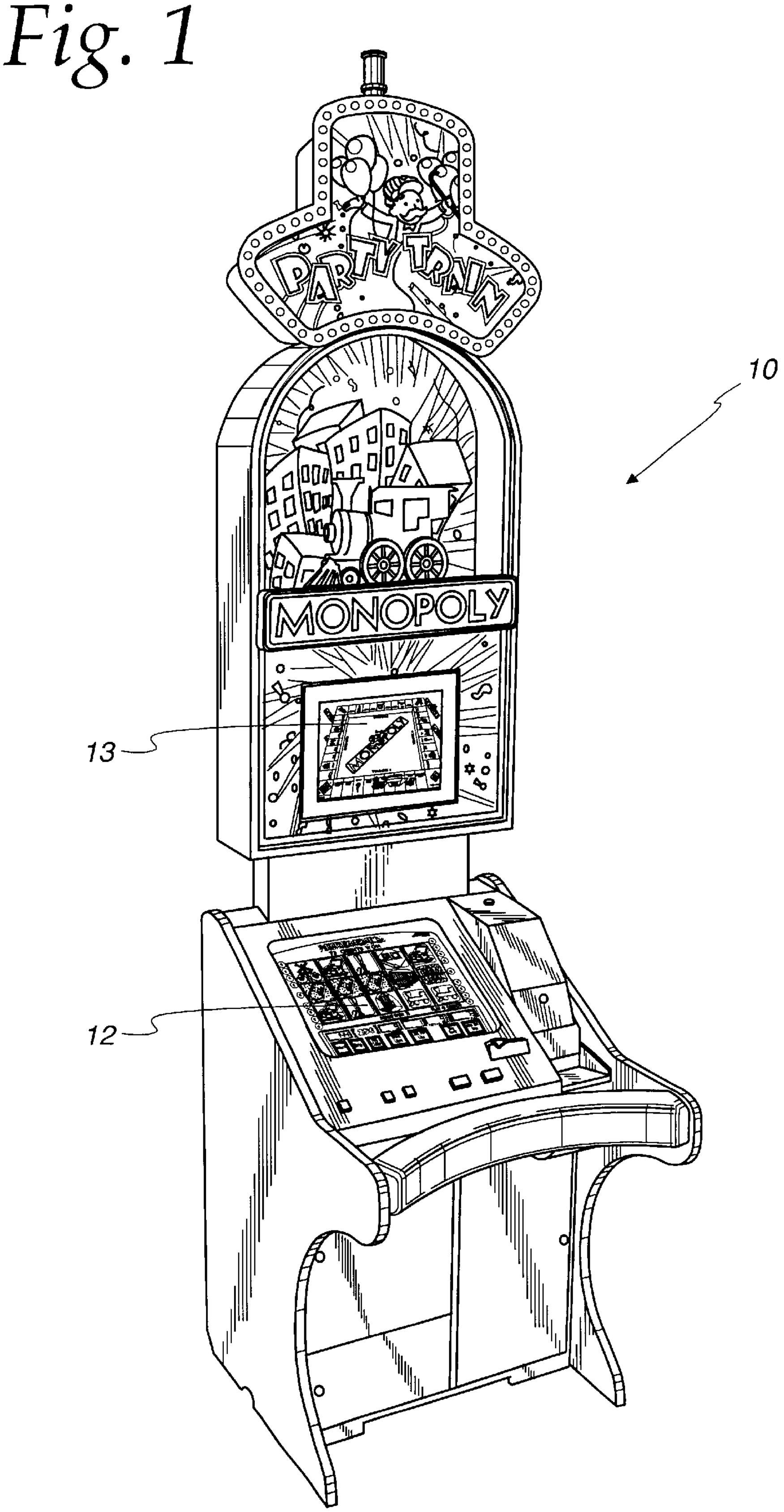
FIG. 1 is a perspective view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, there is depicted a gaming machine 10 that may be used to implement a bonus game according to the present invention. The gaming machine 10 includes lower and upper visual displays 12 and 13, preferably in the form of a dot matrix, CRT, LED, LCD, electro-luminescent, or other type of video display known in the art. The lower display 12 preferably includes a touch screen overlaying the monitor. In the illustrated embodiment, the gaming machine 10 is a "slant-top" version in which the lower display 12 is slanted at about a 30° angle toward the player of the gaming machine 10 and the upper display 13 is oriented vertically relative to the player. Alternatively, the gaming machine may be an "upright" version in which both the lower and upper displays 12 and 13 are oriented vertically relative to the player.

In one embodiment, the gaming machine 10 is operable to play a game of chance entitled MONOPOLY® PARTY TRAIN having a theme based on the popular board game MONOPOLY®. The MONOPOLY® PARTY TRAIN game features a basic slot game with five simulated spinning reels and various bonus games triggered by different outcomes in the basic game. It will be appreciated, however, that the gaming machine 10 may be implemented with themes other than MONOPOLY®.

Figure 2:
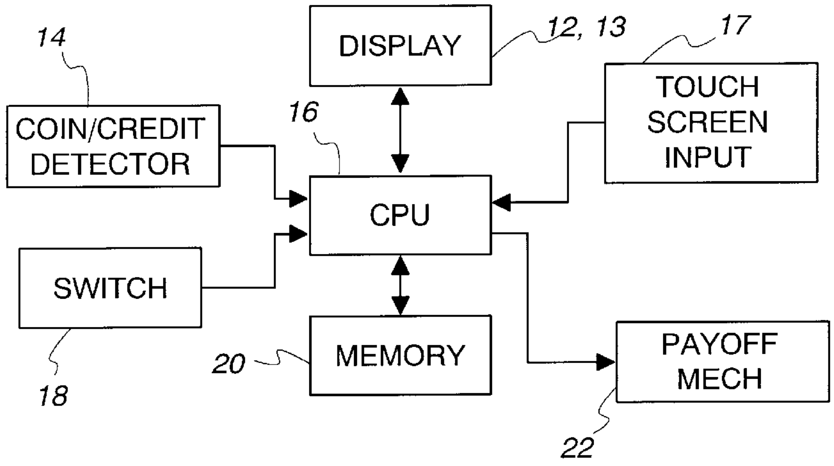
FIG. 2 is a block diagram of a control system suitable for operating the gaming machine.

FIG. 2 is a block diagram of a control system suitable for operating the gaming machine 10. Coin/credit detector 14 signals a central processing unit ("CPU") 16 when a player has inserted a number of coins or played a number of credits. Then, the CPU 16 operates to execute a game program that causes the lower display 12 to display the basic game that includes simulated symbol-bearing reels. The player may select the number of pay lines to play and the amount to wager via touch screen input keys 17. The basic game commences in response to the player activating a switch 18 (e.g., by pulling a lever or pushing a button), causing the CPU 16 to set the reels in motion, randomly select a game outcome, and then stop the reels to display symbols corresponding to the pre-selected game outcome. In one embodiment, certain of the basic game outcomes cause the CPU 16 to enter an associated bonus mode causing one or both of the displays 12 and 13 to show an associated bonus game.

A system memory 20 stores control software, operational instructions, and data associated with the gaming machine 10. In one embodiment, the memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which may occur in the basic game or bonus games. The payoff amounts corresponding to certain combinations of symbols in the basic game are predetermined according to a pay table stored in system memory 20. The payoff amounts corresponding to certain outcomes of the bonus games are also stored in system memory 20.

Figure 3:
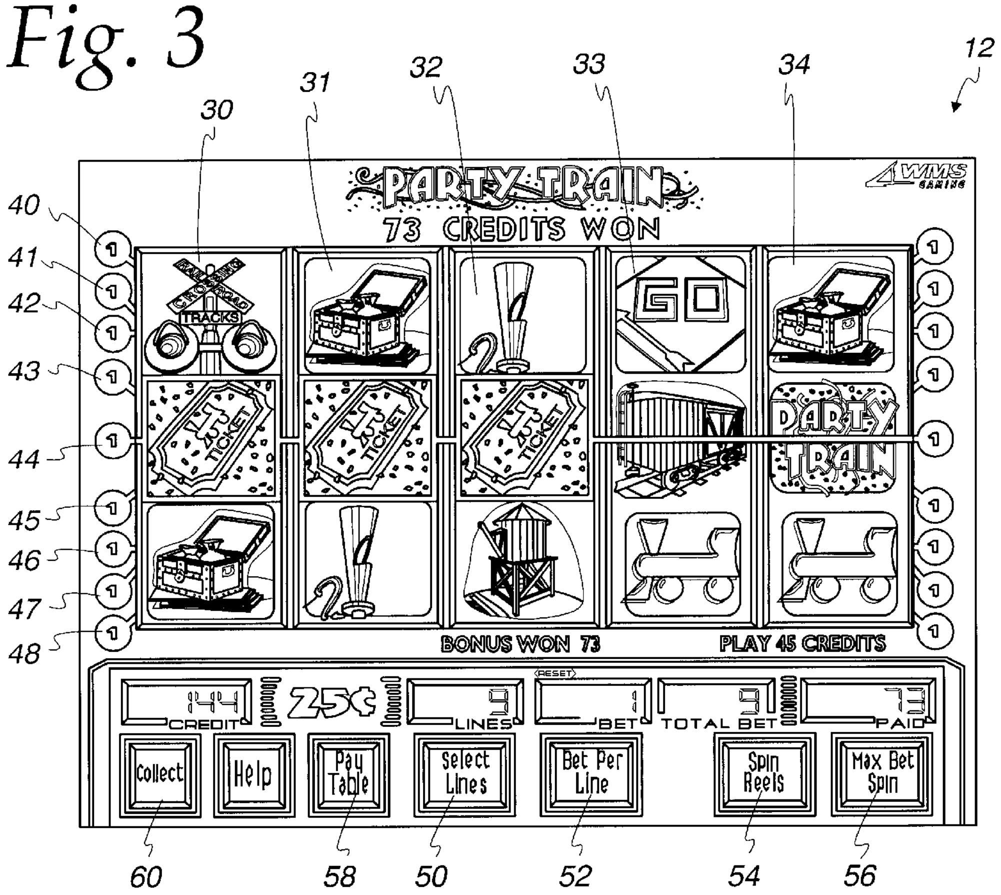
FIG. 3 is a display screen capture showing the simulated reels of a five-reel, nine-line basic game played on the gaming machine.

As shown in FIG. 3, the MONOPOLY® PARTY TRAIN basic game is implemented on the lower display 12 on five video simulated spinning reels 30–34 (hereinafter "reels") with nine pay lines 40–48. Each of the pay lines 40–48 extends through one symbol on each of the five reels 30–34. Generally, game play is initiated by inserting a number of coins or playing a number of credits, causing the CPU 16 (FIG. 2) to activate a number of pay lines corresponding to the number of coins or credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30–34 may be set in motion by touching the "Spin Reels" key 54 or, if the player wishes to bet the maximum amount per line, by using the "Max Bet Spin" key 56 on the lower video display 12.

Alternatively, other mechanisms such as, for example, a lever or push button may be used to set the reels in motion. The CPU 16 uses a random number generator to select a game outcome (e.g., "basic" game outcome) corresponding to a particular set of reel "stop positions." The CPU 16 then causes each of the video reels 30–34 to stop at the appropriate stop position. Video symbols are displayed on the reels 30–34 to graphically illustrate the reel stop positions and indicate whether the stop positions of the reels represent a winning game outcome. Some of the video symbols disposed on the reels 30–34 are illustrated in FIG. 3 and include a PARTY TRAIN, "GO," COMMUNITY CHEST, WATER TOWER, BOXCAR, MR. MONOPOLY, RAILROAD, TRAIN CROSSING SIGNAL, FREE PARKING, TRAIN WHISTLE, and TRAIN TICKET.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active pay line correspond to one of the winning combinations on the pay table. A winning combination, for example, could be three or more WATER TOWER symbols 62 along an active pay line, where the award is greater as the number of WATER TOWER symbols 62 along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 60. The game optionally employs a WILD symbol that can serve as another symbol to create a winning combination but, preferably, is not wild for one or more of the symbols used to trigger a bonus game. In a preferred implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes are a plurality of start-bonus outcomes for starting play of their associated bonus games. A start-bonus outcome may be defined in any number of ways. For example, a start-bonus outcome occurs when a special start-bonus symbol or a special combination of symbols appears on one or more of the reels 30–34. The start-bonus outcome may require the combination of symbols to appear along an active pay line or, alternatively, may require that the combination of symbols appear anywhere on the display, regardless of whether the symbols are along an active pay line. The appearance of a start-bonus outcome causes the CPU to shift operation from the basic game to the associated bonus game.

Three or more TICKET symbols 64 along an active pay line trigger a railroad bonus game. In FIG. 3, three TICKET symbols 64 are depicted along the middle horizontal pay line 44 which, if active, triggers the railroad bonus game. The railroad bonus game consists of a main game, a Chance sub-bonus game, and a Community Chest sub-bonus game. Both the main game and the sub-bonus games utilize Monopoly game cards.

Figure 4:
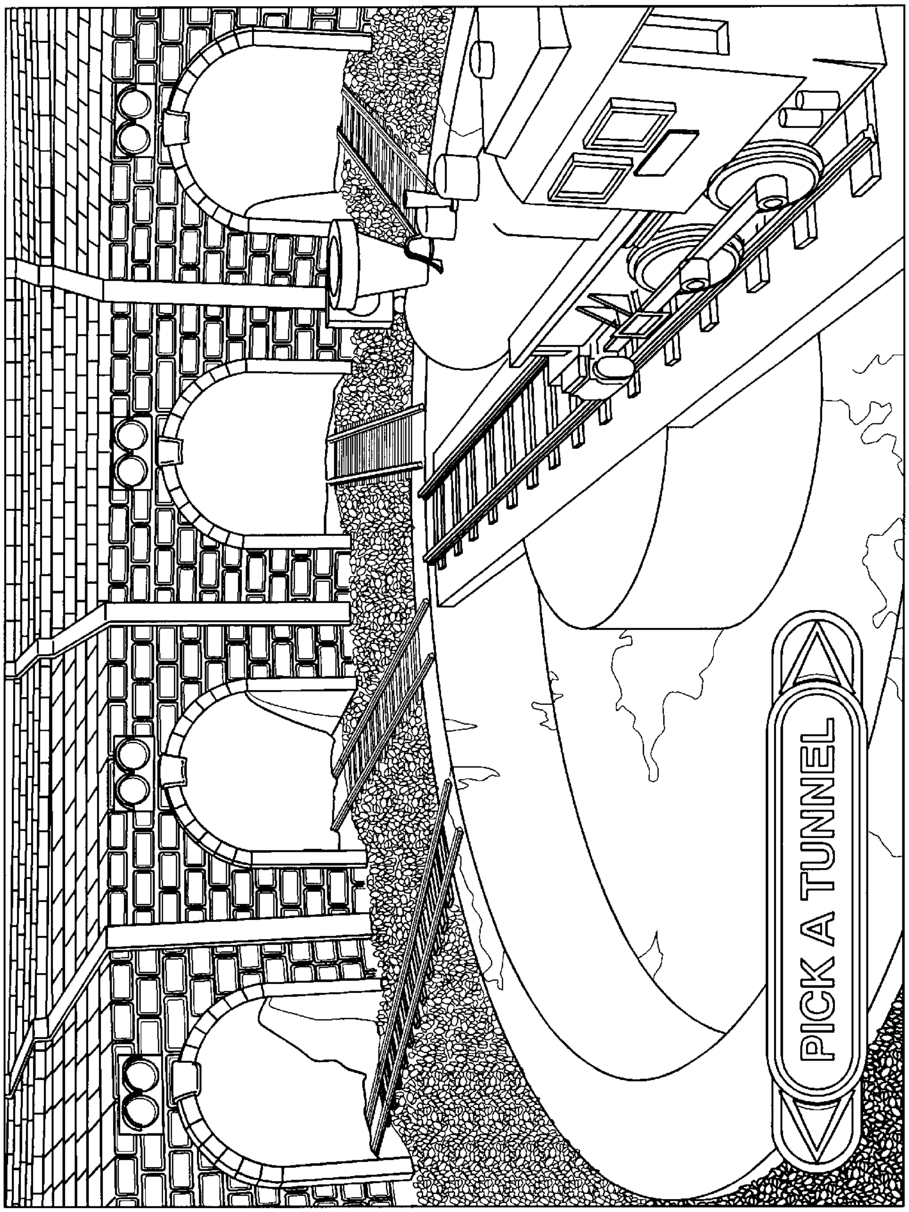
FIGS. 4 through 16 are display screen captures associated with a railroad bonus game, where FIGS. 9 through 11 relate to a Community Chest sub-bonus game and FIGS. 14 and 15 relate to a Chance sub-bonus game.
Figure 5:
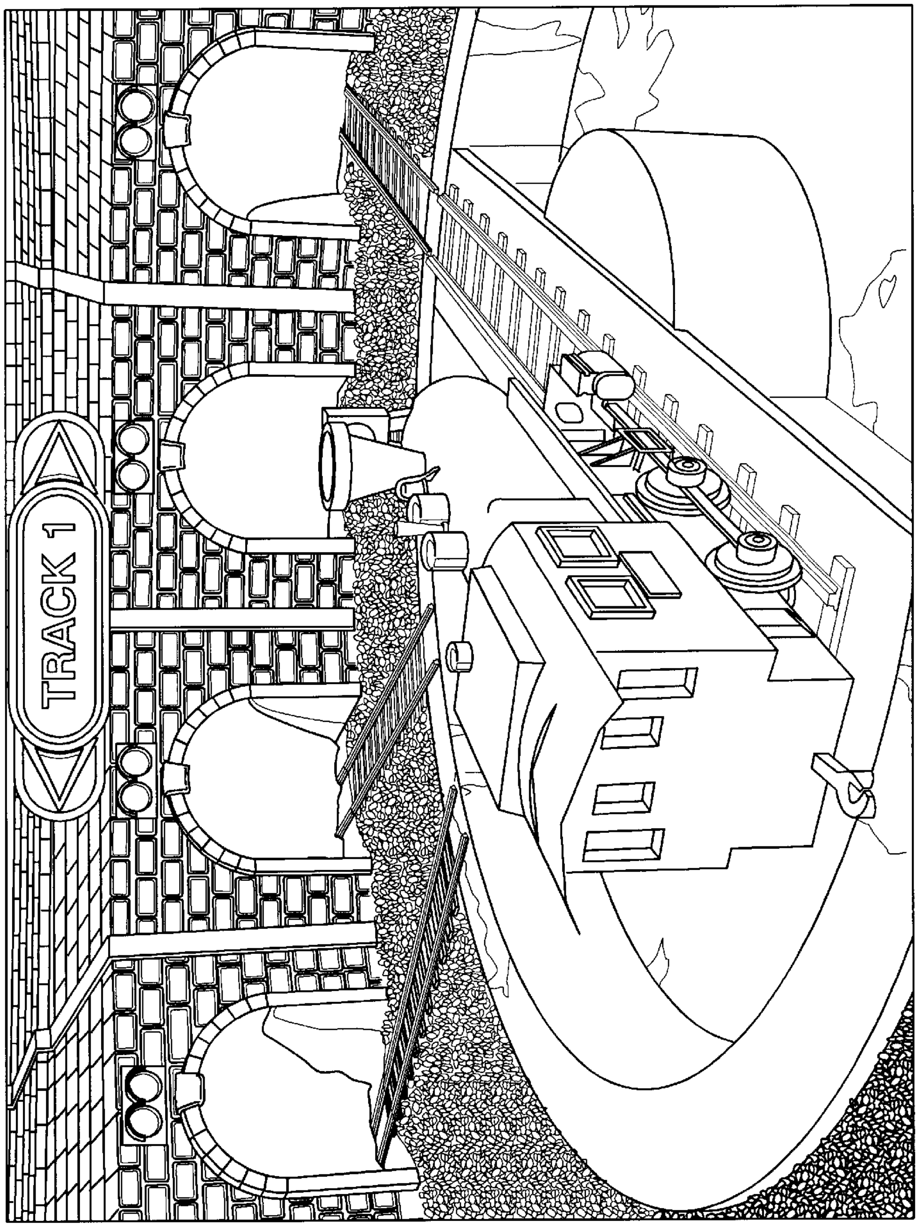
Figure 6:
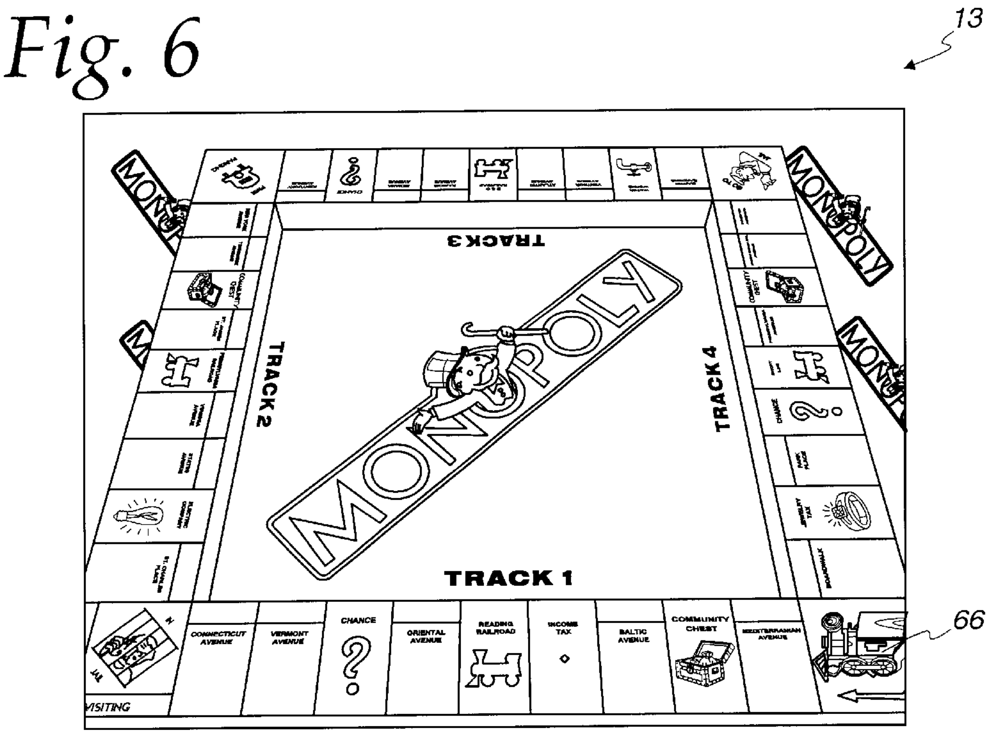

Referring to FIG. 4, when a player enters the railroad bonus game, the player is prompted to select, via the touch screen, one of four railroad tracks depicted on the lower display 12. Each track represents one side of a MONOPOLY game board. To select a track, the player touches a tunnel traversed by the track. Referring to FIG. 5, after a track has been chosen, the lower display 12 identifies the selected track (e.g., track 1 in FIG. 5) and aims the train towards the associated tunnel. At approximately the same time, one of the corners on the game board depicted on the upper display 13 in FIG. 6 flashes to notify the player as to the track (board side) on which the player will be playing. The train 66 is initially located on the flashing corner, e.g., "Go" square in FIG. 6.

Figure 7:
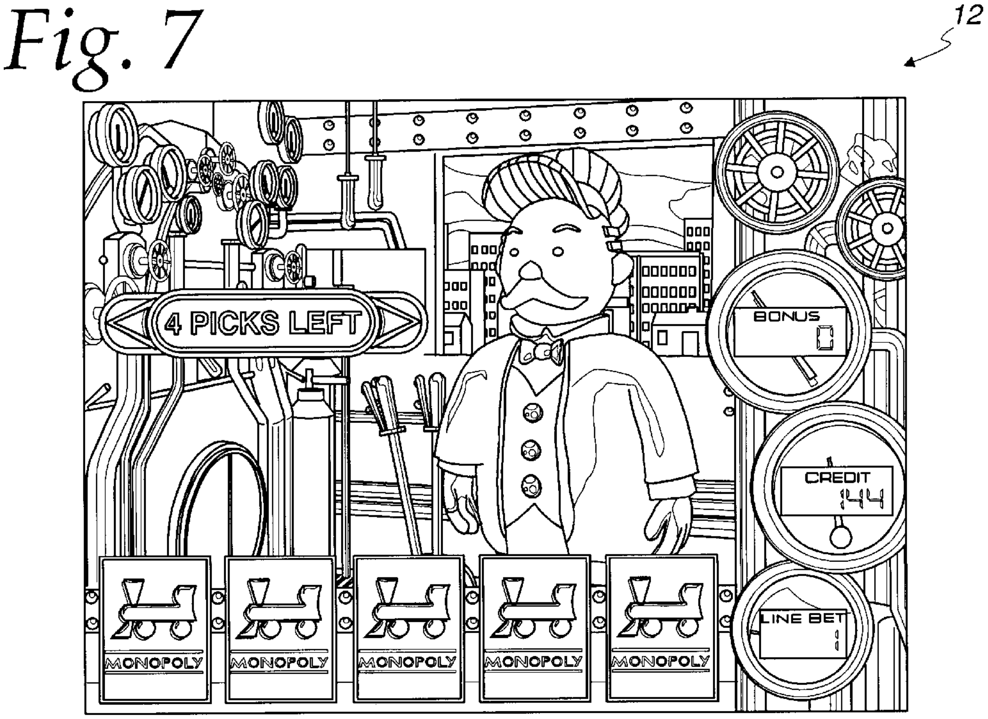

Referring to FIG. 7, the player then must successively select four Monopoly game cards, one at a time, out of a plurality of cards initially shown on the lower display 12. The cards are selected via the touch screen. After each selection, the selected card turns over to reveal a number of spaces that the train 66 can move along the game board. The train 66 then moves along the track (board side) by the revealed number of spaces. The main game of the railroad bonus game awards bonuses associated with the respective properties on which the train 66 lands. The CPU randomly determines the bonuses associated with the respective properties at the start of the railroad bonus game. A property reveals its associated bonus when the train 66 lands on the property. After the player's fourth selection, the railroad bonus game ends if the train 66 fails to reach the corner at the beginning of the next track (board side). The railroad bonus game continues, however, if, following the fourth selection, the train 66 reaches the next side of the game board to switch tracks. The objective is to prolong play and earn additional bonuses by propelling the train 66 to the next side of the game board to switch tracks and earn four more card selections.

Figure 8:
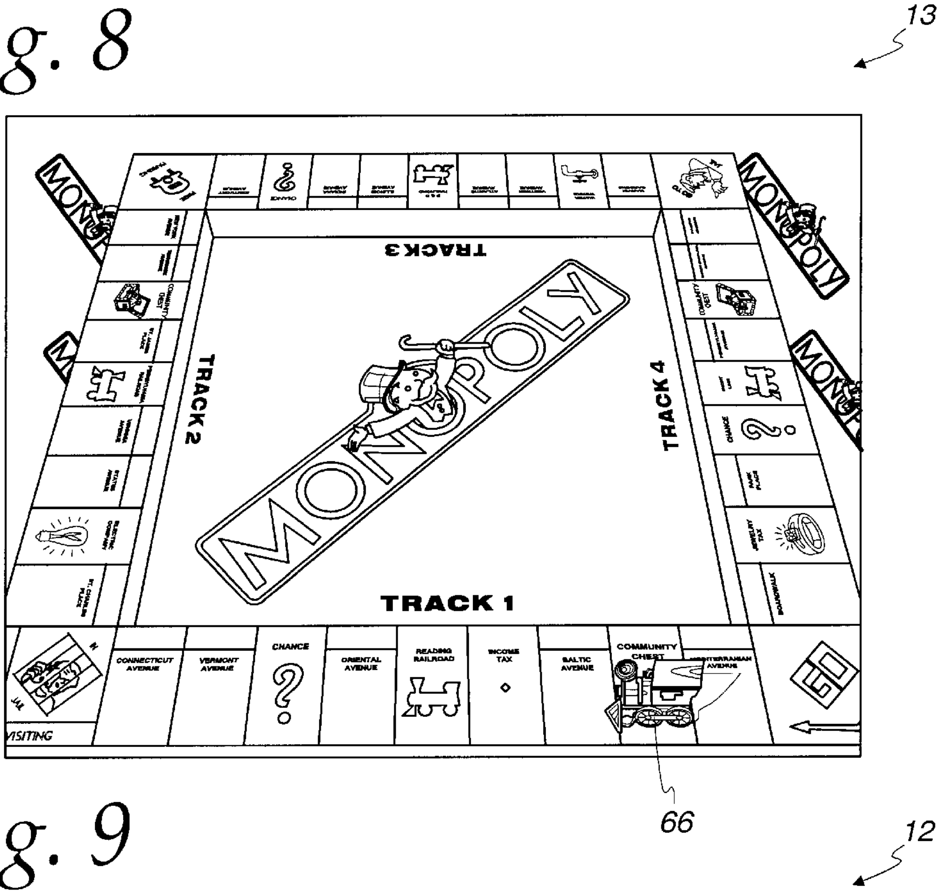
Figure 9:
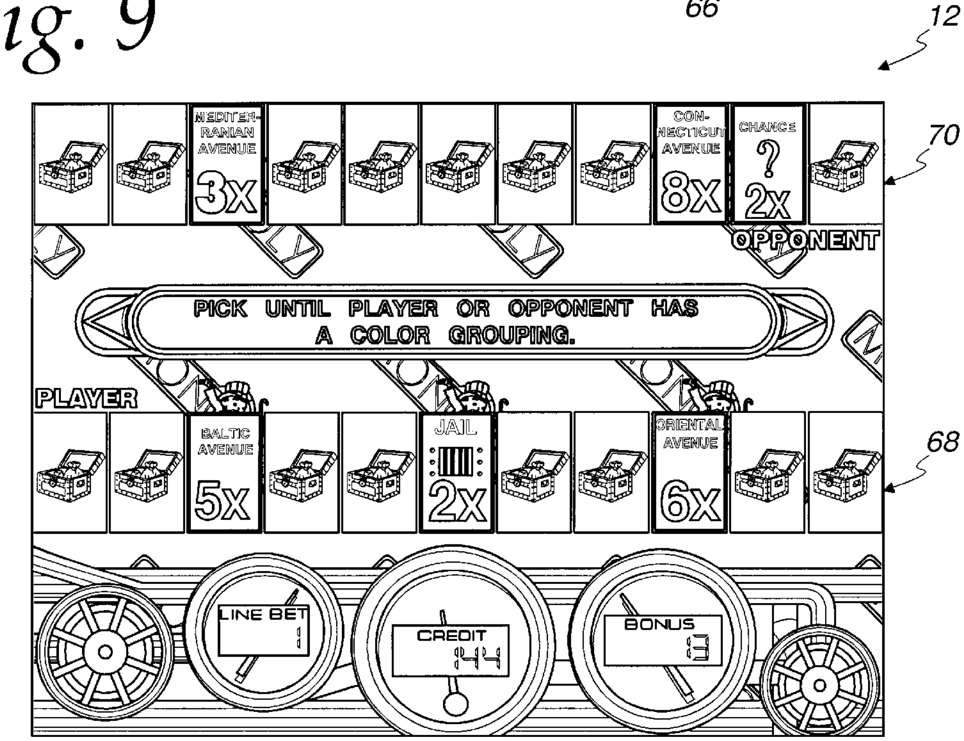

Certain spaces on the game board generate special events. First, if the train 66 lands on Community Chest during the railroad bonus game, as depicted in FIG. 8, the CPU shifts operation to the Community Chest sub-bonus game depicted in FIG. 9. As shown in FIG. 9, the player and the opponent (CPU) each initially receive a set of eleven deed cards. The player's card set 68 and the CPU's card set 70 each include the eleven properties along the track (board side) being traversed by the train 66 in FIG. 8. The player's deed cards 68 and the CPU's deed cards 70 each are initially face down so that the property indicia is hidden from view. Also, the player's deed cards 68 and the CPU's deed cards 70 each are scrambled so that the cards are not in the same sequence as they appear on the Monopoly board. The player's deed cards 68 are likely scrambled in a different order than the CPU's deed cards 70. A predetermined bonus (multiplier or number of credits) is associated with, and preferably printed on, the hidden face of each card.

At the start of the Community Chest sub-bonus game, the lower display 12 prompts the player to select one of the player's deed cards 68 via the touch screen. In response to selecting one of the player's deed cards 68, the selected card is "turned over" to reveal the associated property and bonus. The player is awarded the bonus associated with the player's selected card. The CPU then randomly selects one of the CPU's deed cards 70. The selected card is turned over to reveal the associated property and bonus. The player and the CPU repeat the foregoing process of selecting deed cards from their respective card sets in alternating fashion until either the player or the CPU has turned over all deed cards in a property group, i.e., all deed cards of the same color. Cards unaffiliated with any color do not count towards a property group. In the illustrated example, there are two possible property groups for track 1, namely, (1) Mediterranean Avenue and Baltic Avenue and (2) Oriental Avenue, Vermont Avenue, and Connecticut Avenue.

Figure 10:
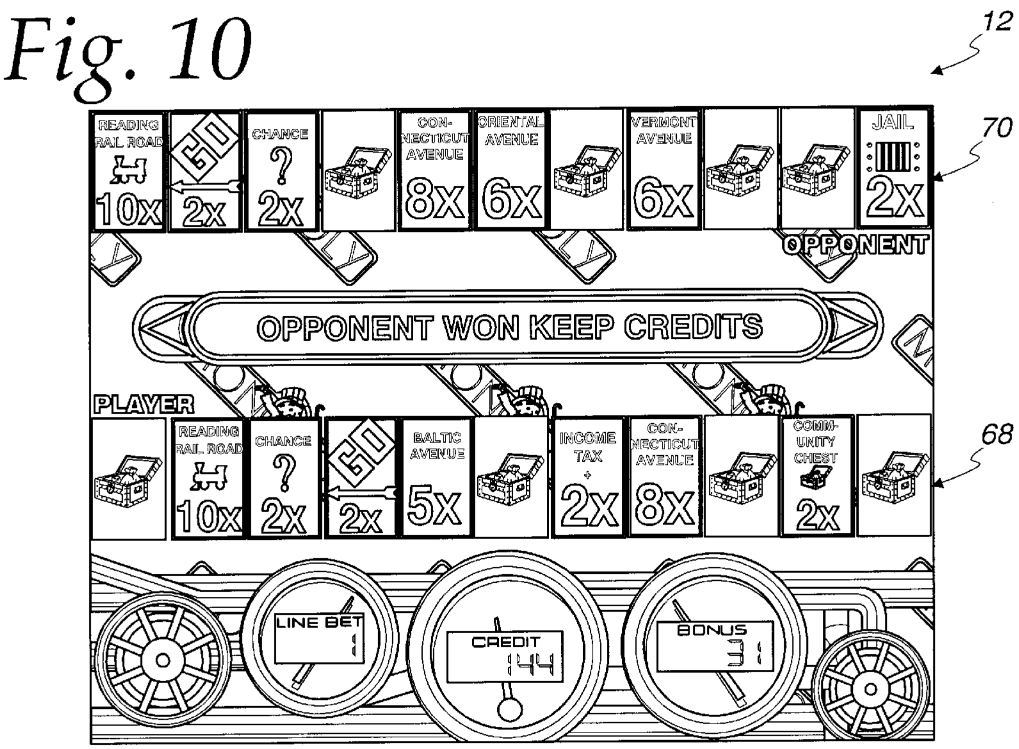
Figure 11:
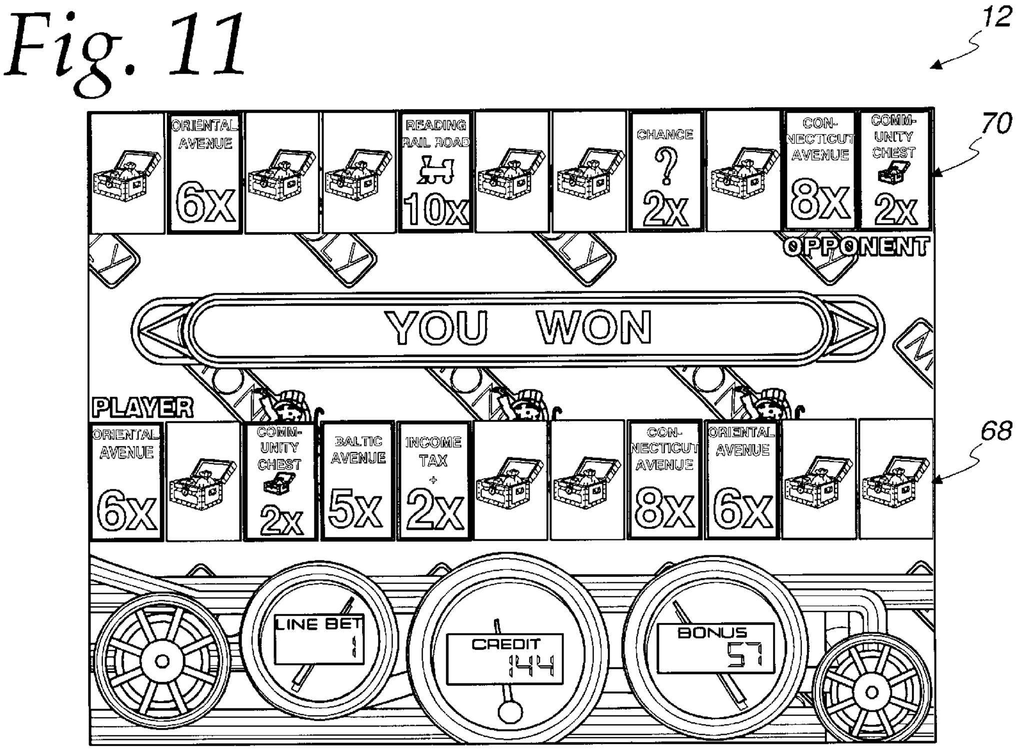

Referring to FIG. 10, on the one hand, if the CPU is first to achieve a property group, the player retains the bonuses associated with the cards selected from the player's card set 68. The player, however, is not awarded the bonuses associated with the cards selected from the CPU's card set 70.

Referring to FIG. II, on the other hand, if the player is first to achieve a property group, the player not only retains the bonuses associated with the cards selected from the player's card set 68 but also collects the bonuses associated with the cards selected from the CPU's card set 70. After the Community Chest sub-bonus game is completed, the CPU shifts operation back to the main portion of the railroad bonus game.

In an alternative embodiment, instead of the CPU selecting cards from the CPU's card set 70, the player selects the cards from the CPU's card set 70. Because the cards are initially face down, such selections by the player would still effectively be random. While this alternative embodiment has the advantage of increasing the level of interactivity between the player and the game, the increased interactivity generally decreases the speed at which the game is played.

Figure 12:
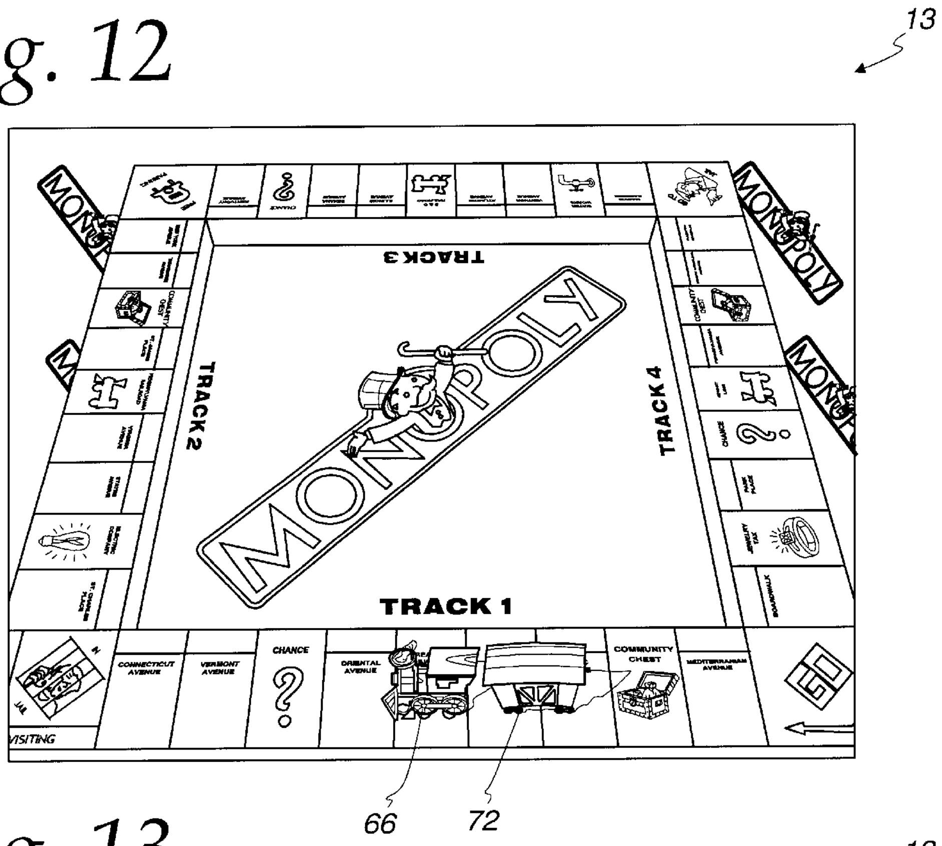

A second special event that can be triggered by the main portion of the railroad bonus game concerns the railroad properties. Specifically, if the train 66 lands on any of the four railroad properties, such as the Reading Railroad in FIG. 12, the railroad property generates a "boxcars" outcome that adds a boxcar 72 to the train 66. With respect to any subsequent properties on which the train 66 lands, the railroad bonus game awards the standard bonus for that property plus a supplemental bonus. The supplemental bonus is equal to the standard bonus multiplied by the number of added boxcars. For example, if the train 66 with one boxcar 72 lands on a property normally worth five bonus credits, the player will be awarded the standard bonus of five credits plus a supplemental bonus of five credits multiplied by one (due to one boxcar) for a total of ten bonus credits.

Figure 13:
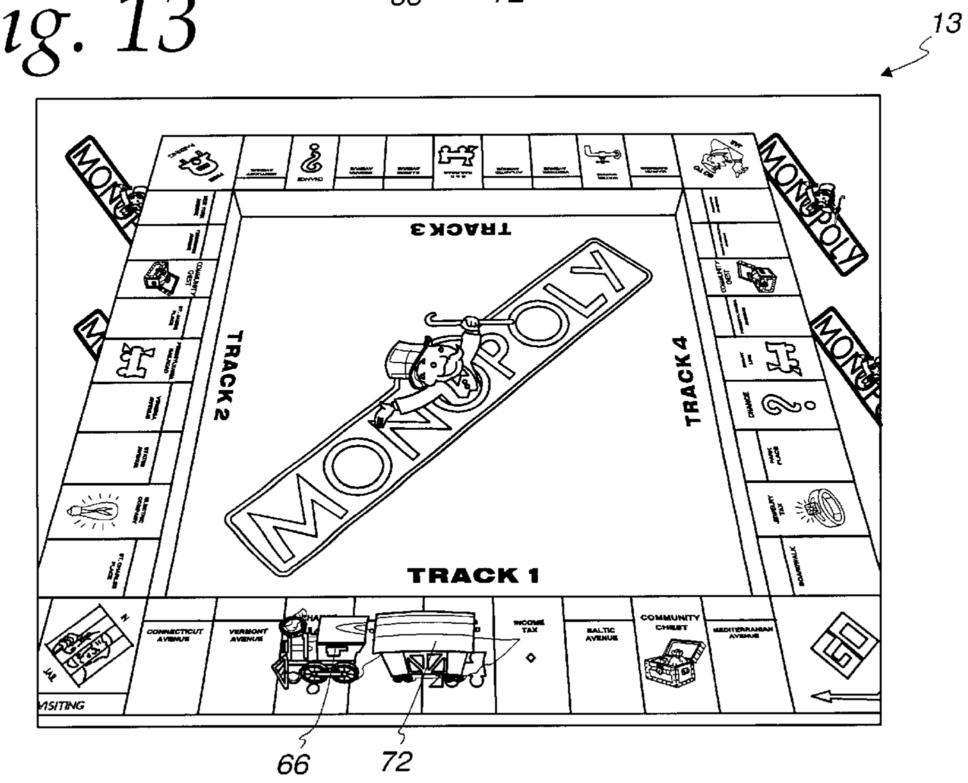
Figure 14:
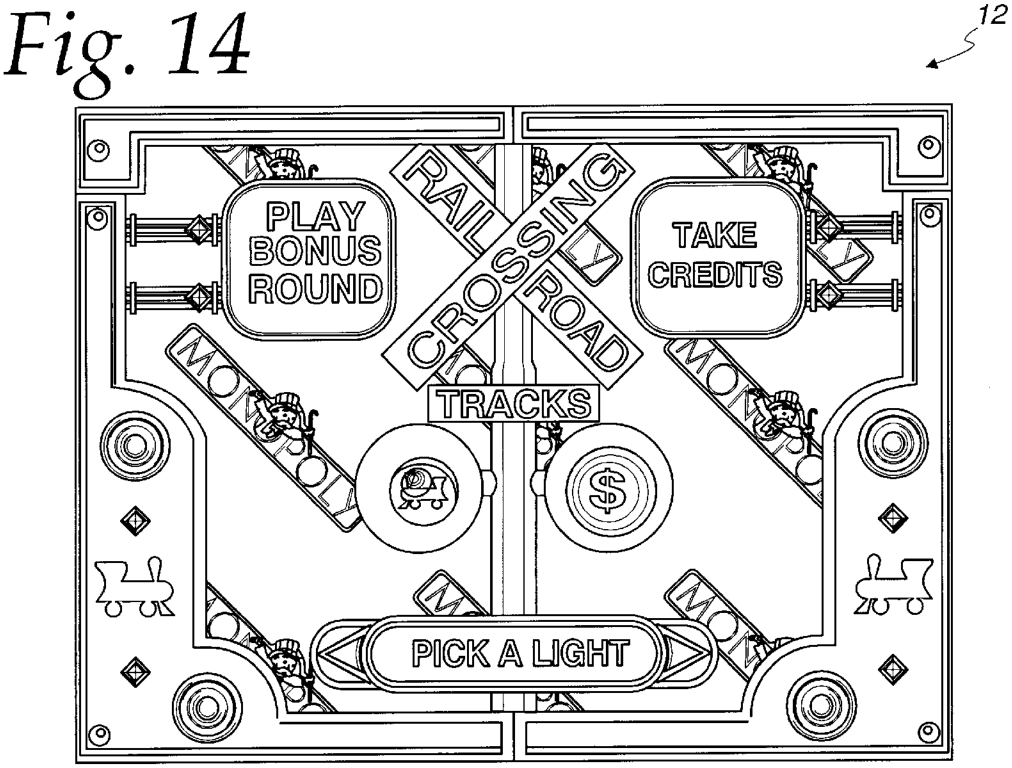
Figure 15:
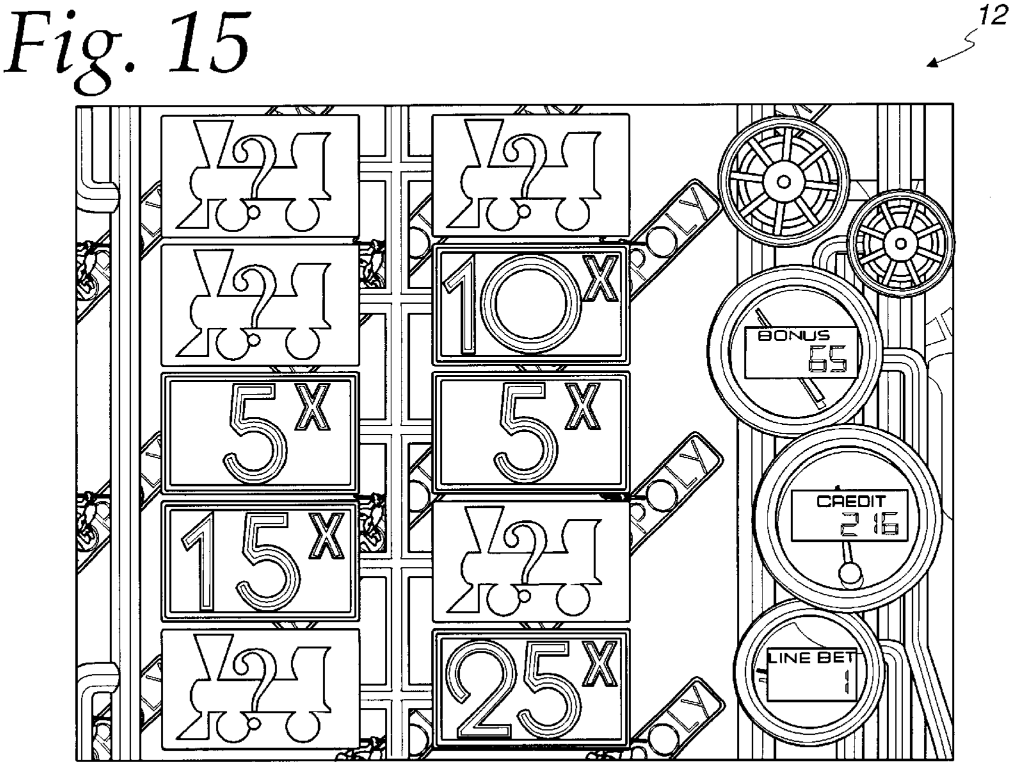

A third special event that can be triggered by the main portion of the railroad bonus game concerns the Chance property. Specifically, if the train 66 lands on Chance during the railroad bonus game, as depicted in FIG. 13, the CPU shifts operation to the Chance sub-bonus game depicted in FIG. 14. As shown in FIG. 14, the Chance sub-bonus game offers the player a choice to either "Take Credits" or "Play Bonus Round." If the player elects to "Take Credits" by selecting this option via the touch screen, the player is awarded a randomly selected number of bonus credits. The CPU then ends the Chance sub-bonus game and shifts operation back to the main portion of the railroad bonus game. If, however, the player elects to "Play Bonus Round" by selecting this option via the touch screen, the player may win more or less credits than the random number that would have been awarded by the "Take Credits" option. For the "Play Bonus Round" option illustrated in FIG. 15, the lower display 12 depicts ten Monopoly game cards initially concealing their respective values. Most of the game cards are associated with a bonus (multiplier or number of credits) revealed upon selection, while one or more of the game cards are associated with an end-bonus outcome. The end-bonus outcome may, for example, be represented by tax indicia (e.g., Luxury Tax or Income Tax) revealed upon selection of the card. Using the touch screen, the player successively selects the cards to reveal and collect their associated bonuses until selecting the card associated with the end-bonus outcome, which terminates the Chance sub-bonus game and causes the CPU to shift operation back to the main portion of the railroad bonus game.

In an alternative embodiment, one of the Monopoly game cards in the Chance sub-bonus game is associated with a bonus-resource outcome. The bonus-resource outcome may, for example, be represented by Get-Out-Of-Jail Free or some other "saving" indicia revealed upon selection of the card. The player can use this bonus-resource card to supersede (trump) the end-bonus effect of a later selected end-bonus card and allow the bonus round to continue.

Figure 16:
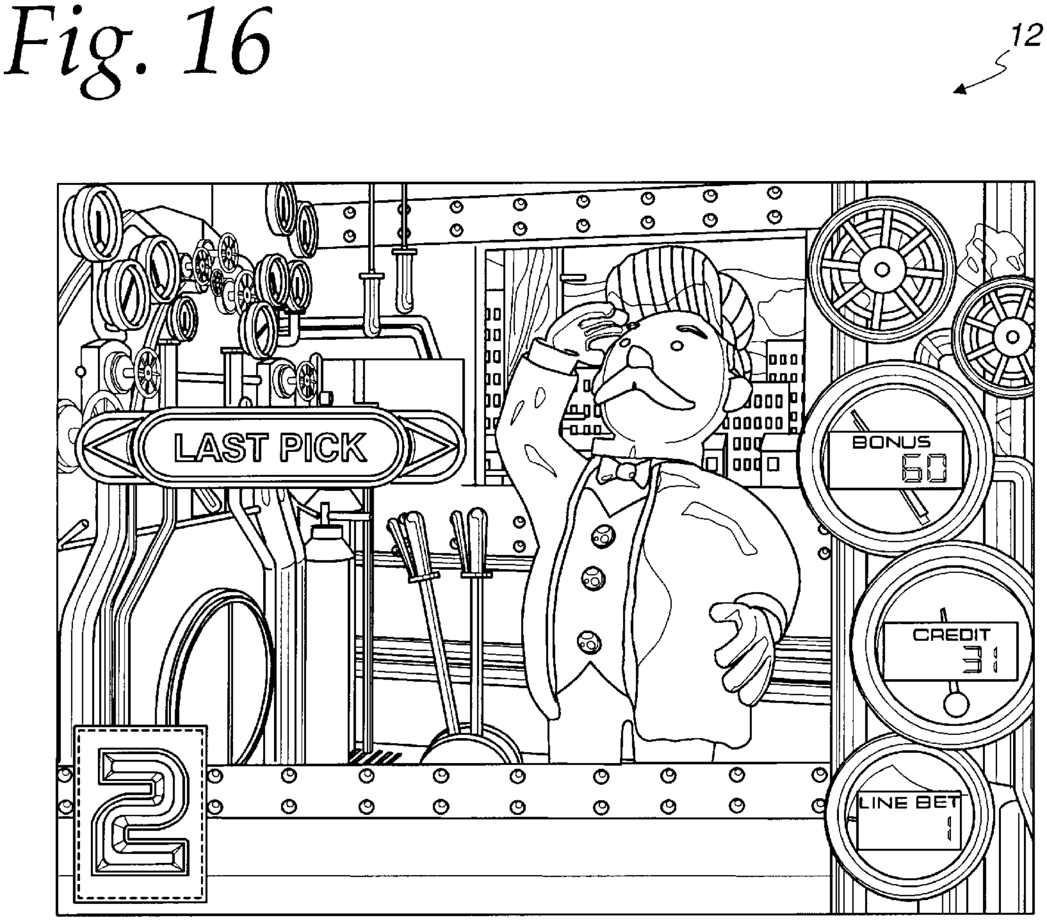

Referring to FIG. 16, the lower display 12 notifies the player when the player has made his or her fourth card selection in the main portion of the railroad bonus game. After the player's fourth selection, the railroad bonus game ends if the train 66 fails to reach the corner at the beginning of the next track (see FIG. 13). The CPU then shifts operation back to the basic reel game.

While the present invention has been described with reference to one or more particular embodiments, those skilled in the art will recognize that many changes may be made thereto without departing from the spirit and scope of the present invention. For example, instead of simulating the reels on a video display, the reels may be mechanical and driven by respective stepper motors. If the reels are mechanical, the bonus games are entirely animated on the upper display 13. If the upper display 13 is within easy reach of a player, the upper display 13 may be outfitted with a touch screen. Alternatively or in addition, the gaming machine may allow the player to select game play elements appearing on the upper display using physical push-buttons. Each of these embodiments, and obvious variations thereof, are contemplated as falling within the spirit and scope of the claimed invention, which is set forth in the following claims.

What is claimed is:

1. A chance game feature for a gaming machine controlled by a processor in response to a wager, the chance game feature comprising:

a first portion associated with the processor and a first bonus, and second portion associated with a player and a second bonus, the second portion competing with the first portion in a competition between the first and second portions, the competition between said first portion and said second portion randomly generates said first and second bonuses;

the processor awarding the first bonus to the player only in response to meeting predetermined criteria.

2. The game feature of claim 1, wherein the processor awards the second bonus to the player whether or not the predetermined criteria is met.

3. The game feature of claim 1, wherein the predetermined criteria includes the second portion prevailing over the first portion in the competition between the first and second portions.

4. The game feature of claim 1, wherein the first and second portions each include a plurality of selectable game cards depicted on a visual display, the game cards of the first and second portions being successively and alternatingly selected until one of the first and second portions has associated ones of the cards of that portion selected, the one of the first and second portions being a winner of the competition.

5. The game feature of claim 4, wherein the predetermined criteria includes the one of the first and second portions being the second portion.

6. The game feature of claim 4, wherein the associated ones of the cards have matching indicia revealed upon selection.

7. The game feature of claim 6, wherein the matching indicia is the same color.

8. The game feature of claim 4, wherein the game cards of the first and second portions are selected by the player.

9. The game feature of claim 4, wherein the game cards of the first portion are selected by the processor, and the game cards of the second portion are selected by the player.

10. The game feature of claim 4, wherein the first and second bonuses are accumulated as the game cards are selected.

11. A chance game feature for a gaming machine controlled by a processor in response to a wager, the chance game feature comprising:

a first portion associated with the processor and a first bonus; and a second portion associated with the player and a second bonus;

the processor awarding the first bonus to the player in response to the second portion prevailing over the first portion in a competition between the first and second portions, the competition between said first portion and said second portion randomly generates said first and second bonuses.

12. The game feature of claim 11, wherein the processor does not award the first bonus to the player in response to the first portion prevailing over the second portion in the competition.

13. The game feature of claim 12, wherein the processor awards the second bonus to the player whether or not the first portion prevails over the second portion in the competition.

14. The game feature of claim 11, wherein the first and second portions each include a plurality of selectable game cards depicted on a visual display, the game cards of the first and second portions being successively and alternatingly selected until one of the first and second portions has associated ones of the cards of that portion selected, the one of the first and second portions being a winner of the competition.

15. The game feature of claim 14, wherein the associated ones of the cards have matching indicia revealed upon selection.

16. A gaming machine controlled by a processor in response to a wager, the gaming machine comprising:

a basic game of chance including a start-bonus outcome; and a bonus game of chance triggered by the start-bonus outcome and including a game feature, the game feature including first and second portions, the first portion being associated with the processor and a first bonus, the second portion being associated with a player and a second bonus, the second portion competing with the first portion, the competition between said first portion and said second portion randomly generates said first and second bonuses, the game feature awarding the first bonus to the player only in response to meeting predetermined criteria.

17. A method of operating a chance game feature for a gaming machine controlled by a processor in response to a wager, the method comprising:

providing a first game portion associated with the processor and a second game portion associated with the player;

playing a competition between the first and second game portions to randomly generate respective first and second bonuses; and awarding the first bonus to the player only in response to meeting predetermined criteria.

18. The method of claim 17, further including awarding the second bonus to the player whether or not the predetermined criteria is met.

19. The method of claim 17, wherein the predetermined criteria includes the second game portion prevailing over the first game portion in the competition.

20. The method of claim 17, wherein the first and second portions each include a plurality of selectable game cards depicted on a visual display, wherein the step of playing the competition between the first and second game portions includes successively and alternatingly selecting the game cards of the first and second game portions until one of the first and second game portions has associated ones of the cards of that game portion selected, the one of the first and second game portions being a winner of the competition.

21. The method of claim 20, wherein the predetermined criteria includes the one of the first and second game portions being the second game portion.

22. The method of claim 20, wherein the associated ones of the cards have matching indicia revealed upon selection.

* * * * *